July 18, 1961  W. E. WILLIAMS  2,992,589
OPTICAL STRESS METER
Filed Feb. 18, 1958

William E. Williams,
INVENTOR.

BY Robert M. McManigal
Attorney

United States Patent Office 2,992,589
Patented July 18, 1961

2,992,589
OPTICAL STRESS METER
William E. Williams, Pasadena, Calif., assignor to Cepac, Inc., a corporation of Delaware
Filed Feb. 18, 1958, Ser. No. 715,968
5 Claims. (Cl. 88—14)

The present invention relates generally to an optical stress meter, and is more particularly concerned with a portable device for such purpose, which is so arranged as to enable the rapid assessment of the magnitude and direction of the principal stresses at various points in large transparent installations or large scale photo elastic models under stress.

One object of the present invention is to provide an optical stress meter of improved novel design, which embodies inherent advantages of operation and by means of which more accurate determination of the stresses in the specimen under test may be obtained.

A further object is to provide an optical stress meter having a larger field than conventional meters.

Another object is to provide an optical stress meter in which it is possible to utilize a white light source.

Further objects of the invention will be brought out in the following part of the specification, wherein detailed description is for the purpose of fully disclosing the invention without placing limitations thereon.

Figure 1:
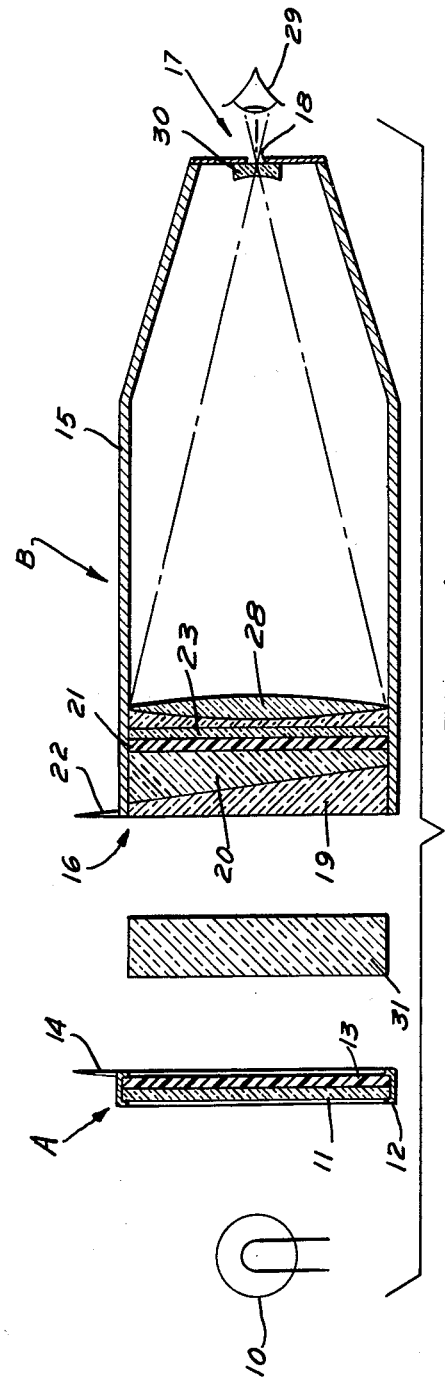
Figure 2:
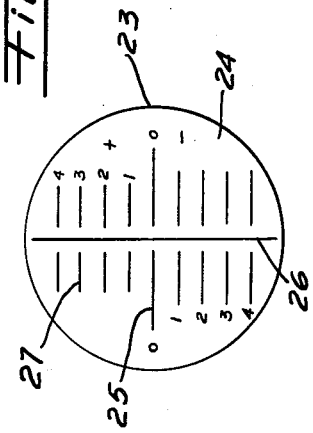

Referring to the accompanying drawings, which are for illustrative purposes only:

FIG. 1 is a longitudinal section diagrammatically illustrating the details of the optical stress meter of the present invention; and FIG. 2 is a view in elevation of the scale as used in the analyzer unit of the present invention.

Referring now more specifically to the drawings, for illustrative purposes, the optical stress meter of the present invention is shown as comprising two sections which are utilized together, a section A which may be termed a polarizer unit, and a section B which may be termed an analyzer unit.

The polarizer unit A comprises briefly an electric lamp 10 which provides a source of white light. This lamp is mounted within a suitable housing (not shown) and is positioned on the axis of a diffusing screen 11 of milk glass or other suitable material which is mounted in a rotatably supported ring 12 with a sheet of white polarizing material 13. Various materials may be utilized for the polarizer, and for such purpose the material commercially known by the trademark "Polaroid" is admirably suited. The rotatable ring 12 carries an index pin 14 which is so positioned on the ring periphery that its direction makes an azimuth of 45° with the plane of polarization (direction of the electric vector) of the sheet of polarizing material.

The analyzer unit B is fabricated with an elongate tube 15 which houses the optical parts, to be subsequently described, this tube having an enlarged objective end 16 and an opposite eyepiece end 17 which is provided on the tube axis with a viewing aperture 18. At the objective end of the tube 15, there is provided an objective assembly of a plurality of components which will now be described. These components in their successive order in the direction of the eyepiece end of the tube, comprise a pair of birefringent wedges 19 and 20 of equal thickness at the center of the field and with their optical axes respectively parallel and perpendicular to the common principal section plane (the plane of the paper in FIG. 1) of both wedges. These wedges effectively constitute a fixed wedge Babinet system. Next in order is an analyzer 21 which comprises a sheet of polarizing material such as "Polaroid." This analyzer is so arranged that when an index pin 22, carried at the objective end of the tube 15, is in the same azimuth as index pin 14, the analyzer has its plane of polarization at 90° to that of the polarizing material 13, and this azimuth will be at 45° to the principal section of the Babinet system.

Next to the analyzer 21, a photographic scale 23 is provided. As shown in detail in FIG. 2, the scale is formed on a carrier disc 24 of suitable light conducting material and comprises a diametrically extending zero line 25 and a diametrically extending locus line 26 in right angle relation to the zero line. Extending along the locus line on opposite sides of the zero line are a plurality of spaced graduations 27 which are indicated as being consecutively numbered from one to four. The graduations on one side of the zero line have been indicated with a plus sign, while those on the other side have been indicated by a minus sign. It will be noted that there is a break in the graduation lines adjacent the locus line 26. This permits a greater degree of accuracy in reading the scale.

The spacing of the scale graduations is so made that when a sodium light source is utilized in place of the white light source lamp 10, the fringes coincide exactly with the graduation marks on the scale. The common wedge angle of the wedges 19 and 20 is chosen, having regard to the birefringency of the material, so that between six and twelve sodium fringes are seen in the field of about two inches diameter, and that they coincide with the graduations on the scale. When a white light source is thereafter used, only the central, zero order black fringe coincides with the zero line of the scale. The other colored fringes depart more and more from the graduations as the fringe order increases.

Finally, the assembly at the objective end includes a plano-convex lens system 28, which may be achromatic, this lens system having its focal plane at the viewing aperture 18. When the eye, as generally indicated by the numeral 29 is placed at the aperture 18, the scale 23 will be observed. When the distance from the scale to the aperture is small, for example, in the order of six or seven inches, it is difficult to see the scale clearly. A weak concave lens 30 may be mounted at the focal plane of the lens system 28 so that the virtual image of the scale will be positioned a matter of ten to fifteen inches from the eye at the distance of distinct vision for a normal emmetropic eye.

It should be noted that although the light diverges from the diffusing screen 11, only that light which passes parallel to the axis emerges from the aperture 18 to enter the eye 29. Consequently, there is no detectable parallax between the fringes and the scale, and the zero order fringe is much sharper and darker than in the conventional Babinet compensator arrangement in which the Babinet is mounted in the eyepiece position and rays covering the full angular aperture of the telescope objective pass through the wedges.

Thus, due to the enforced parallelism of the light, in my arrangement, there is no need to mount a sample or test piece close to the analyzer unit B to avoid parallax. A sample to be tested, as indicated by the numeral 31 may therefore be placed anywhere between the polarizer unit and the analyzer unit.

The improvement thus obtained in the definition or clarity of the zero order fringe makes it possible to obtain the azimuth of a principal stress in a sample to within plus or minus 5°. In a stressed sample, the position of a portion of the zero order fringe may be displaced several graduations from the normal zero position. When the sample is rotated in azimuth relative to that of index pins 14 and 22, an azimuth will be found where the portion of black fringe is just as clear and sharply defined as it is in zero order without the sample.

The foregoing means that the dispersion of birefringency with wavelength of most transparent materials is sufficiently similar, that over a range of plus 6 or minus 6 fringes the dark fringe is achromatic. Thus, it is possible to use a white light source with a scale calibrated for the yellow sodium doublet for which wavelength, most of the stress optical coefficients have been measured. If for any special material the compensation was not complete, the zero order fringe would show this by being fringed with color. So far, no such material has been found.

In practical use, the analyzer unit B is displaced vertically or laterally until the point on the test sample, for which the stress vector is desired, coincides or overlaps a portion of the dark fringe. The sample is then oriented in azimuth until the dark fringe is most distinct. At this point on the sample, the magnitude of the stress is given by the displacement of the dark fringe portion from the origin, measured in scale divisions multiplied by the stress optical coefficient of the material for sodium light and divided by the thickness of the sample measured in inches. It is necessary to know whether the stress is compressional or tensional, otherwise it is impossible to say that its direction or azimuth corresponds to that of index pins 14 and 22 (FIG. 1) or the locus line 26 (FIG. 2) which are identical, or to a direction at right angles to this. This ambiguity, common to all polarimetric methods of measuring optical stresses, arises out of the fact that what is measured is the difference in the stresses in two mutually perpendicular azimuths.

Various modifications may suggest themselves to those skilled in the art without departing from the spirit of my invention, and, hence, I do not wish to be restricted to the specific form shown or uses mentioned, except to the extent indicated in the appended claims.

I claim:

1. In an optical stress meter: a polarizer unit, and an analyzer unit including in successive order a plurality of components which comprise a pair of relatively fixed opposed birefringent wedges of equal thickness at the optical center of the field and with their optical axes respectively parallel and perpendicular to the common principal section of both, a polarizing member azimuthed at 45° to said principal section, a scale member for reading fringe displacement, and lens system, said components being permanently bonded together and mounted as an objective assembly at one end of a tube, and means at the other end of said tube defining a small circular aperture positioned at the focal plane of said lens system.

2. An optical stress meter according to claim 1, wherein a weak negative lens is positioned at the circular aperture.

3. An optical stress meter according to claim 1 with projecting pins, one of said pins being on the polarizer unit and another of said pins being on the analyzer unit, said one pin being mounted in a 45° azimuth to the polarization plane of the polarizer, and said other pin corresponding to the principal section of said wedges.

4. An optical device for analyzing stresses in a material subjected to polarized rays from a light source, comprising: an elongate tube having an objective end and an eyepiece end with a viewing aperture, an objective assembly comprising a plurality of components arranged in successive order in the direction of the eyepiece end, said components comprising a pair of relatively fixed opposed birefringent wedges fixedly mounted in said tube at the objective end, said wedges having equal thickness at the optical center of the field and optical axes respectively parallel and perpendicular to the common principal section of both, a polarizing member azimuthed at 45° to said principal section, a scale member for reading fringe displacement, and a lens system having its focal plane positioned at said viewing aperture.

5. An optical device for analyzing stresses in a material subjected to polarized rays from a source of white light, comprising: an elongate tube having an objective end and an eyepiece end with a viewing aperture, an objective assembly comprising a plurality of components fixedly mounted in said tube and arranged in compact stacked successive order in the direction of the eyepiece end, said components comprising a pair of relatively fixed opposed birefringent wedges at the objective end, said wedges having equal thickness at the optical center of the field and optical axes respectively parallel and perpendicular to the common principal section of both, a polarizing member azimuthed at 45° to said principal section, a scale member for reading fringe displacement having divisions coincident with the fringe line separations for a sodium light source, and a lens system having its focal plane positioned at said viewing aperture.

References Cited in the file of this patent

UNITED STATES PATENTS

| | | |
|---|---|---|
| 1,756,785 | Gallasch | Apr. 29, 1930 |
| 1,874,217 | Arberry | Apr. 30, 1932 |

FOREIGN PATENTS

| | | |
|---|---|---|
| 1,116,824 | France | Feb. 13, 1956 |

OTHER REFERENCES

Manual of Petrographic Methods, Johannsen, McGraw-Hill Book Co. (New York), 1918 Second edition, pages 374, 375, 376.

Fundamentals of Optics, Jenkins and White, McGraw-Hill Book Co. (New York), Third edition, 1957, pages 560, 561.